United States Patent [19]

Rainin et al.

[11] Patent Number: 4,763,535

[45] Date of Patent: Aug. 16, 1988

[54] PIPETTE MECHANISM

[75] Inventors: Kenneth Rainin, Piedmont; Haakon T. Magnussen, Jr., Pinole; Roy P. Moeller, Hayward, all of Calif.

[73] Assignee: Rainin Instrument Co., Inc., Emeryville, Calif.

[21] Appl. No.: 4,864

[22] Filed: Jan. 20, 1987

Related U.S. Application Data

[63] Continuation of Ser. No. 795,822, Nov. 7, 1985, abandoned, which is a continuation of Ser. No. 583,900, Feb. 27, 1984, abandoned.

[51] Int. Cl.[4] .......................... B01L 3/02; G01N 1/14

[52] U.S. Cl. .............................. 73/864.18; 73/864.16; 422/100

[58] Field of Search .......... 73/864.16, 864.17, 864.18; 324/61 R; 422/100; 436/54

[56] References Cited

U.S. PATENT DOCUMENTS

| | | | |
|---|---|---|---|
| 2,771,217 | 11/1956 | Brown et al. | 422/100 X |
| 2,968,031 | 1/1961 | Higa | 324/61 R X |
| 2,978,638 | 4/1961 | Wing et al. | 324/61 R X |
| 3,219,925 | 11/1965 | Borley et al. | 324/61 R |
| 3,296,522 | 1/1967 | Wolfendale | 324/61 R X |
| 3,297,941 | 1/1967 | Wolfendale | 324/61 R X |
| 3,498,135 | 3/1970 | Seitz et al. | 73/864.18 |
| 3,702,957 | 11/1972 | Wolfendale | 324/61 R X |
| 3,827,300 | 8/1974 | Thaler | 324/61 R X |
| 3,857,092 | 12/1974 | Meyer | 324/61 R |
| 3,915,651 | 10/1975 | Nishi | 422/100 X |
| 3,928,796 | 12/1975 | Kaiser | 324/61 R |
| 4,066,951 | 1/1978 | Wang | 324/61 R |
| 4,294,321 | 10/1981 | Wittlinger et al. | 324/61 R X |
| 4,345,483 | 8/1982 | Paletta et al. | 73/864.16 |

*Primary Examiner*—Robert Spitzer
*Attorney, Agent, or Firm*—Bielen & Peterson

[57] ABSTRACT

A dashpot piston mounted in a closed chamber is coupled by an axially movable shaft to a pipette piston to regulate return movement of the pipette piston within a pipette cylinder to draw fluid into the cylinder. The dashpot shaft is movable within limits relative to the dashpot piston to accommodate a blow-out of residual fluid from the pipette by the shaft driving the pipette piston beyond a home position to blow residual fluid from the pipette cylinder. An air inlet port in the bottom of the chamber allows air to be drawn into the chamber with upward movement of the dashpot piston while a valve adjacent to the air inlet port opens in response to downward movement of the dashpot piston to exit air from the chamber. Control of the relative sizes of the air inlet port and valve outlet regulates the relative rates of upward and downward piston movement in the cylinder. The dashpot piston carries a movable plate of a variable capacitor transducer for monitoring the position of the pipette piston within the pipette cylinder.

7 Claims, 3 Drawing Sheets

FIG-1
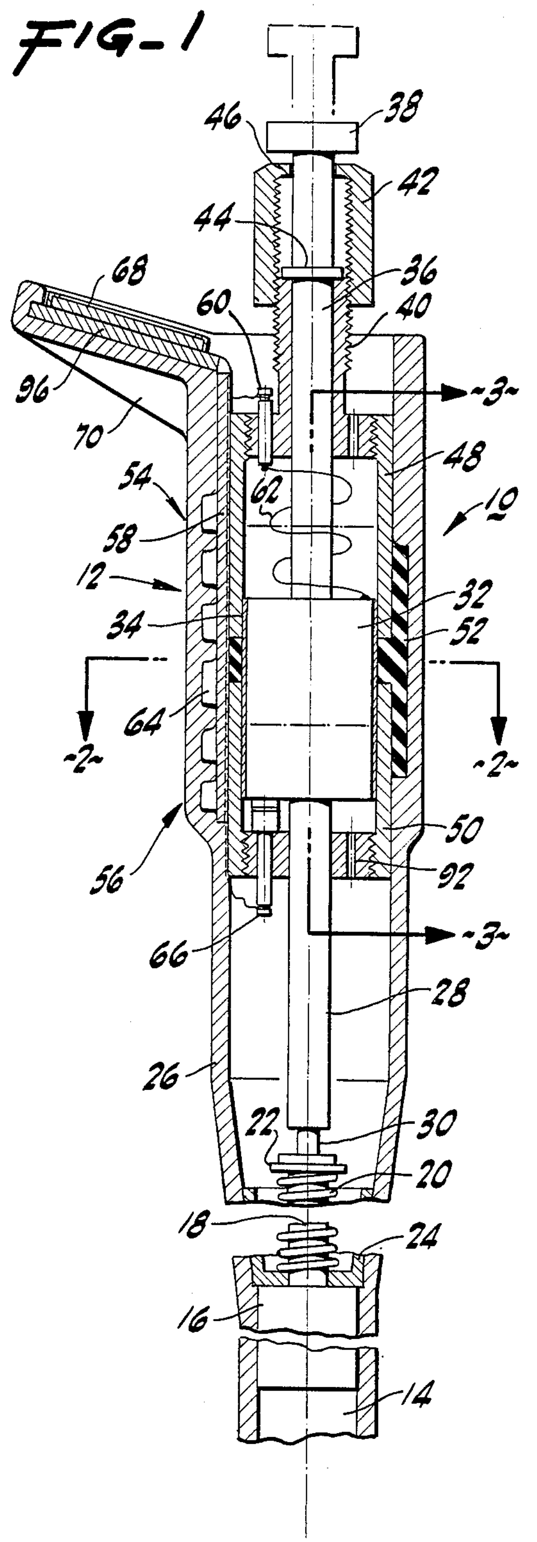
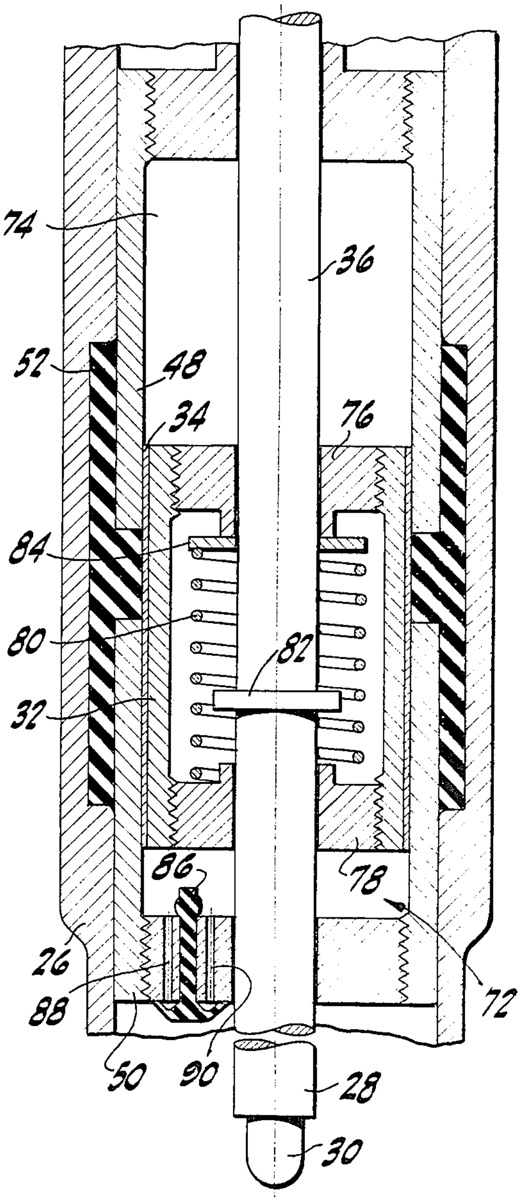
FIG-3
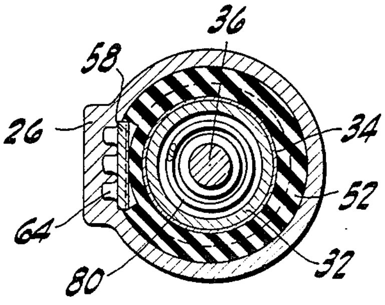
FIG-2

PIPETTE MECHANISM

RELATED APPLICATIONS

This application is a continuation of Ser. No. 795,822, filed Nov. 7, 1985, which is a continuation of Ser. No. 583,900, filed Feb. 27, 1984, both abandoned.

BACKGROUND OF THE INVENTION

The present invention relates to a novel pipette mechanism which includes a transducer for monitoring the position of the piston within the pipette chamber.

Mechanically operated pipettes greatly simplified the titrating and pickup of volumes of fluid. These pipettes included a manual device for setting the desired volume to be picked up or dispensed by the pipette. However, the proper use of mechanical pipettes depended, to a great extent, on the skill of the operator. For example, the user's thumb regulated the speed of the piston within the mechanical pipette on the uptake stroke. Permitting the piston to move to quickly in this mode caused inaccurate dispensing of the fluid taken up by the pipette. Such inaccuracies generally increase with the fatigue of the pipette operator. In addition, the mechanical pipette simply functions to dispense a preset volume of fluid. Moreover, the determination of this setting required turning of a lead screw which is relatively tediuos and time consuming.

U.S. Pat. No. 3,857,092 describes an electrical system using a differential capacitor transducer which is generally applicable to micrometers and other measuring equipments. There is no known prior art which continually determines the amount of liquid being held by a pipette in operation.

SUMMARY OF THE INVENTION

In accordance with the present invention a novel pipette mechanism which continually monitors the volume of fluid held thereby is provided.

The pipette mechanism of the present invention includes a housing which provides a chamber for a piston which is movable within the same. The chamber includes an opening through which fluids enter and leave in accordance with the uptake and discharge strokes of the piston. The pipette mechanism further includes a transducer for continually monitoring position of the piston within the chamber. The transducer would include a portion which is movable with the piston. Thus, the volume of liquid in the chamber at any time is easily determined. This data may be displayed or otherwise used to perform various operations such as pipetting, titration, determination of liquid volumes, and the like.

The transducer may be formed of a pair of plates, one supported by the housing which is relatively stationary and the other which is movable with the piston and the piston chamber. Further, a third plate may be placed adjacent the second plate such that a pair of variable capacitors is provided. The plates may be flat, circular or the like. It should be noted that the transducer may take other forms such as optical devices, sonar devices, magnetic, inductance, and resistance measuring devices, strain gauges and other transducing apparatuses.

The pipette mechanism of the present invention may further include a pair of stops limiting the travel of the piston in the chamber in either the discharge or uptake direction. Such stops would aid in the determination of the volume of fluid being handled by the pipette. In this regard, a dashpot may also be provided to control the rate of travel of the piston with the chamber, especially during the uptake stroke. Means for urging the piston in this manner may externalize in a spring of predetermined strength. The dashpot may be incorporated into the plate of the variable capacitor(s) in that such plate may be positioned within a container having an orifice as an opening thereto. The plate would be sized to snuggly fit within such container such that the orifice size would determine the rate of travel of the plate and the piston of the pipette connected thereto.

Circuit means is also utilized to transform the relative capacitance of the two variable capacitors into a measurement of the position of a piston within the chamber. Of course, knowing the position of the piston within the chamber may easily be converted into the measurement of the volume of the liquid in a chamber of known dimensions. The circuit may be arranged within an operational amplifier which has a cyclical input. The first portion of the cyclical input would be dependent on the value of both variable capacitors. A second portion of the cyclical input would be dependent on only one of the variable capacitors. Thus, the amplifier output would include at least two signals, one dependent on both variable capacitors and one dependent on only one of the variable capacitors. A detector or comparator would recognize the first and second amplifier output signals and the transition point between the same. The detector would signal this transition to means which would measure and compare the time span of the first and second output signals. This determination is easily transformed into the position of the piston within the piston chamber and may be displayed as the volume of liquid within the chamber.

It may be obvious that a novel and useful pipette mechanism has been described.

It is therefore an object of the present invention to provide a pipette mechanism which includes a transducer for continually monitoring the position of the piston within the piston chamber of the pipette, and thus the volume of liquid within the chamber at any time.

It is another object of the present invention to provide a pipette mechanism which reduces, to a large degree, operator influence on the proper operation of the pipette mechanism.

It is another object of the present invention to provide a pipette mechanism which may be used to perform other functions such as titration, measuring of specific volumes of liquids found in container, in addition to the usual pipetting functions.

Another obejct of the present invention is to provide a pipette mechanism which possesses a high degree of accuracy and speed in performance of pipetting and related functions.

Yet another object of the present invention is to provide a pipette mechanism which is relatively inexpensive and simple to operate.

The invention possesses other objects and advantages especially as concerns particular characteristics and features thereof which will become apparent as the specification continues.

BRIEF DESCRIPTION OF THE DRAWINGS

FIG. 1 is a sectional view of the pipette mechanism showing a broken portion depicting the piston and connecting rod.

FIG. 2 is a view taken along line 2—2 of FIG. 1.

FIG. 3 is a view taken along line 3—3 of FIG. 1.

Figure 4:
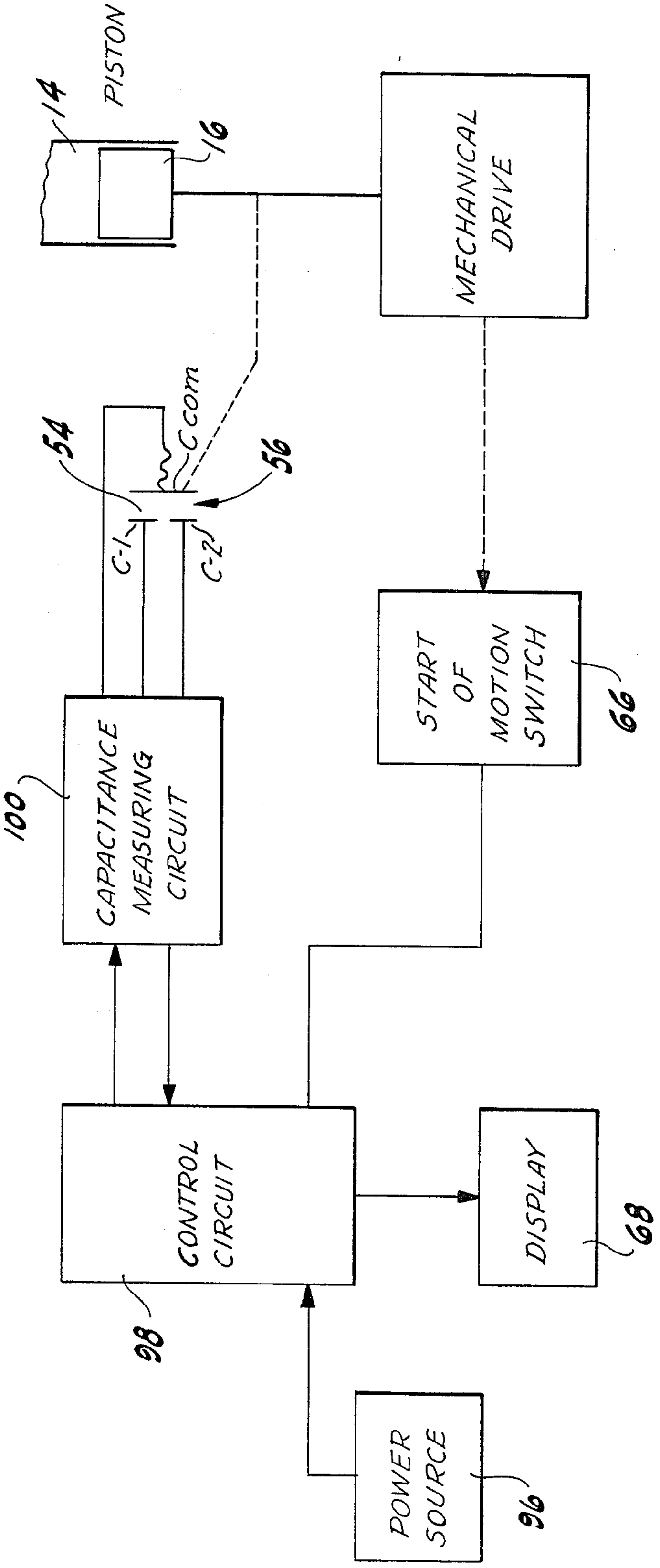
FIG. 4 is a block diagram depicting the functional interaction of the mechanical and electrical portions of the present invention.

For a better understanding of the invention reference is made to the following detailed description of the preferred embodiments thereof which should be taken in conjunction with the hereinabove described drawings.

DESCRIPTION OF THE PREFERRED EMBODIMENTS

Various aspects of the present invention will evolve from the following detailed description of the preferred embodiments which should be referenced to the hereinabove drawings.

The pipette as a whole is shown in the drawings and identified by reference character 10. Pipette 10 includes a housing 12 which provides a piston chamber 14. Piston 16 travels with chamber 14 in a reciprocal manner as is known with prior art mechanical pipettes. In this regard piston 16 includes a seal to prevent liquid from travelling past the piston. As with conventional mechanical pipetting devices this seal may be an o-ring (not shown).

A piston rod 18 connects to piston 16 and is spring biased by spring 20. Spring 20 rests on a collar 22 and a shoulder 24 within barrel 26. A shaft 28 having a reduced portion 30 connects to piston rod 18. This connection between shaft 28 and piston rod 18 may be constructed for easy detachment and assembly. This is especially important if the piston 16 and piston chamber are to be interchangeable to accommodate a variety of liquid volumes being handled by pipette 10.

Shaft 28 extends and connects to capacitor plate 32 which may be termed the common plate. Capacitor plate 32 is in the form of a conducting cylindrical member having a dielectric sleeve 34 thereabout. As may be surmised, capacitor plate 32 moves with piston 16. A shaft 36 extending from shaft 28 terminates in a push button 38, whose upper position is shown in phantom. An end cap 40 includes an external thread which engages the internal thread of adjustment nut 42. The ring 44 about shaft 36 engages the flange 46 of adjustment nut 42 to produce a stop for piston 16 in the upward direction. Thus, adjustment nut 42 determines the volume of fluid which will enter chamber 14.

Capacitor plates 48 and 50 are also provided and are separated by insulated sleeve 52. It may be apparent, that a pair of variable capacitors 54 and 56 are formed by the interaction of capacitor plates 32 and 48 and 32 and 50 respectively. Capacitor plate 32 is connected to PC board by the use of electrical contact 60 having a flexible lead wire 62. Capacitor plates 48 and 50 connect directly to PC board 58. Barrell 26 extending over PC board 58 includes a multiplicity of chambers 64 to house circuitry components extending from PC board 58. An electrical switch 66 signals the furthest downward movement of capacitor plate 32 and may be translated into the "home" position of piston 16 within piston chamber 14. A readout 68 is also shown on pedestal 70 of barrel 26.

FIG. 3 shows a detail of a dashpot 72 which controls the rate of travel piston 16 upwardly under the influence return spring 20. A chamber or container 74 is formed around capacitor plate 32. Plate 32 threadingly engages threaded nut 76 and 78 which surrounds shaft 36. A spring 80 is found within the confines of capacitor plate 32 and end nuts 76 and 78. Collar 82 on shaft 36 bottoms on nut 78. Thus, the piston 16 may travel beyond the stop formed by ring 44 and flange 46, hereinabove described, to blow out the piston chamber 14 of any excess liquid. The blow out stroke would be determined by the distance of collar 82 from nut 78. Collar 84 attached to shaft 36 pushes spring 80 downwardly during this blow out stroke and tends to return shaft 36 to the position shown in FIG. 3 after blow out. Flapper valve 86 would permit air to leave chamber 74 during movement of capacitor 32 toward piston chamber 14. Air would escape through orifices 88 and 90. On the upstroke, air would pass through orifice 92; the size of orifice 92 controlling the rate of travel of piston 16 in that direction.

Turning to FIG. 4, it may be seen that circuit means 94 is provided to convert the measurements of variable capacitors 54 and 56 into an indication of the volume of fluid within piston chamber 14 on readout or display 68. Power source 96 may be a conventional DC battery and may be self contained in the pipette mechanism 10. Circuit means 94 would include a control circuit 98 and a capacitance measuring circuit 100. Electrical switch 66 would signal the start of motion piston 16.

Figure 5:
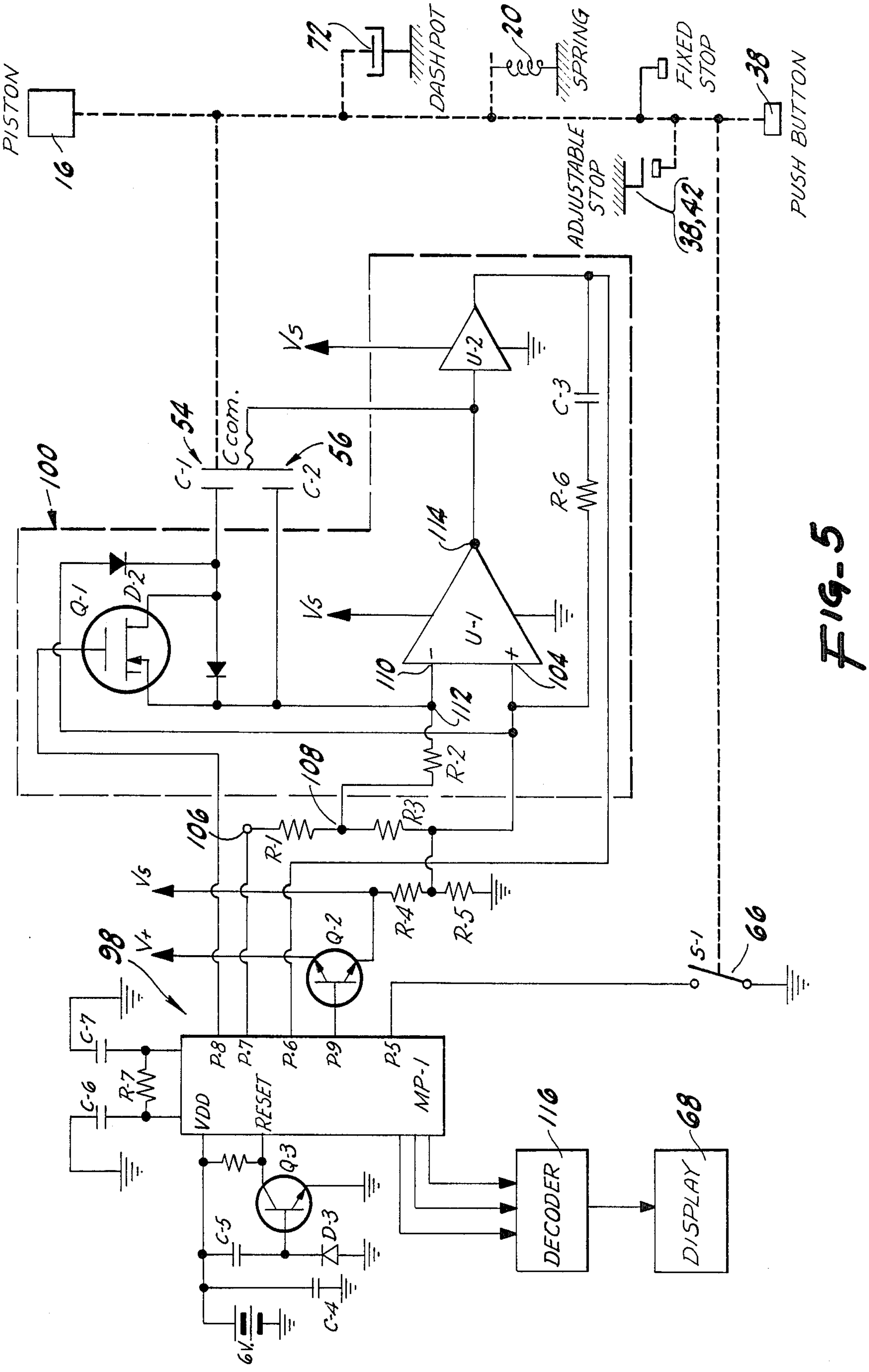
FIG. 5 is a schematic view of the circuit employed in the present invention.

FIG. 5 details the operation of control circuit 98 and capacitance measuring circuit 100. When Q-2 turns ON, the voltage supply from power source 96 is sent to control circuit 98 and capacitance measuring circuit 100. Node 102 at this point is one-half the voltage value of power source 96, in this case three volts, since R-4 and R-5 serve as a voltage divider. Therefore, non-inverting voltage input 104 to U-1 would be at three volts in this example. The signal coming from MP-1 port 7 is a cyclical signal which goes up and down between zero and 6 volts. Node 106 is either found at plus three volts or minus three volts above the value of node 102. Further, node 108 is above or below the node 102 reference by equal amounts which is determined by the value of R-1, R-2 and R-3. This value may be a fraction of a volt. If operational amplifier U-1 is not in saturation then the inverting input 110 is equal to the non-inverting input 104.

There is a predetermined voltage drop across R-2, therefore, the current to summing node 112 is either sinked or sourced thereto at a particular value. Again, this value may be a fraction of a microamp. The voltage output at node 114 at U-1 rises or ramps at a rate inversely proportional to the capacitance between node 112 and 114. This rate is also proportional to the current through R-2. It has been found that the capacitance of variable capacitors 54 and 56 have followered the following formula:

$$\frac{C-1}{(C-1)+(C-2)} = \frac{X}{D}$$

where C-1 is the capacitance of variable capacitor 54, C-2 is the capacitance of variable capacitor 56, X is the distance travelled by piston 16 within piston chamber 14, and D is the maximum distance that piston 16 may travel in piston chamber 14.

Returning to the basic cycle of operation, when node 106 goes to its low value, the output of U-1 at node 114 ramps up for a fixed time determined by the interval of the signal coming from port 7 of MP-1. At this time, diode D-1 is forward biased, therefore, the rate of rise of the ramp is inversely proportional to the sum of the capacitances of C-1 and C-2. On the other hand, when node 106 is high, the U-1 output 114 ramps downwardly. At this time, diode D-1 is reversed biased and diode D-2 is forward biased. This removes the influence of capacitance C-1 and the characteristic of the ramp is inversely proportional to C-2 alone.

At this time, caparator or detector U-2 is looking for a zero crossing (in our example from plus three volts to minus three volts). Each such event is signalled to microprocessor port 6. A timer in MP-1 counts the number of clock pulses in the ramp up and the ramp down outputs of operational amplifier U-1. The ratio of these time intervals is proportional through the hereinabove relationship between C-2 and the sum of C-1 and C-2. Thus, for any position of C-com (plate 32) the ramp up time interval is fixed. On the other hand, the ramp down, when C-com is in this configuration, depends on C-2. This time difference between the ramp up and ramp down outputs of U-1 is translated by MP-1 into the position of piston 16 within piston chamber 14 and into the volume of liquid within piston chamber 14. The clock frequency of MP-1, i.e. the basic count unit, is determined by the R-7, C-6 and C-7 circuits. Since ratios of time are being dealt with, a change in the clock frequency is not critical. This unit may comprise a crystal and capacitors.

Certain errors occur in circuits 98 and 100. For example, voltage splitter R-4 and R-5 may not be exactly one-half of the supply voltage because of the tolerance of these resistors. Also, op. amp U-1 is not a perfect device since it may produce a bias current which effects the current reference to summing node 110, i.e. occurring through R-2. Further, U-1 possesses an offset voltage which may cause an imbalance between inputs 104 and 110 which in turn imbalances the source and sink current. Shunt switch Q-1 reduces these sources of error. When Q-1 turns "ON", C-1 and C-2 are connected in parallel. This means that the ramp down and up are determined by C-1 and C-2 only for any position of C-com. MP-1 feeds the ramp time with Q-1 "ON" into the regular cycle emanating from port 7 of MP-1. In effect, the initial ramp up coming from U-1 is the same as the time determined by the ramp down when Q-1 is ON. The subsequent ramp down, however, when Q-1 is turned off depends on C-2 alone. In effect, the ramp up output of U-1 has been standardized by the turning "ON" of Q-1.

Isolation resistor R-6 and capacitor C-3 provide an R-C time constant to prevent multiple switching of U-2. Switch S-1 determines the start of motion of the piston from its "home" position. The activation of switch S-1 is fed into port 5 of MP-1 which begins the activity of port 7.

C-4, C-5, D-3 and Q-3, comprise a reset circuit which resets MP-1 to a known value when any source of DC power 96, a battery is installed.

Decoder 116 received a serial type signal from MP-1. The decoder sends this information to display 68 which is readable by the operator of the pipette.

The following is a typical list of components for the schematic shown in FIG. 5.

| | |
|---|---|
| R - 1 | 170 Kohm |
| R - 2 | 1 Mohm |
| R - 3 | 10 Kohm |
| R - 4 | 10 Kohm |
| R - 5 | 10 Kohm |
| R - 6 | 10 Kohm |

-continued

| | | | |
|---|---|---|---|
| R - 7 | Clock Unit CMP-33-1, | | 9-OMI + Z Capar (Crystal) |
| U - 1 | Op. amp | LM 192 | Nat. Semi |
| U - 2 | Comparator | Unit | |
| SWITCHES | | | |
| Q - 1 | Mosfet or FET 3N138 | | Motorola |
| Q - 2 | Bipolar NPN | | Nat. Semi |
| Q - 3 | Bipolar NPN | | Nat. Semi |
| DIODES | | | |
| D - 1 | IN914 | | Motorola |
| D - 2 | IN914 | | Motorola |
| D - 3 | IN914 | | Motorola |
| Decoder | COPS 472N | | Nat. Semi |
| Triplex Display | Digital | | A.N.D. (Custom Made) |
| Power Supply | 6VDC Li. | | Rayovac |
| C-1 | Variable | | |
| C-2 | Variable | | |
| C-3 | 47 PF | | |
| C-4 | 0.1 MF | | |
| C-5 | 0.1 MF | | |
| C-6 | 33 pf | | |
| C-7 | 33 pf | | |
| MP-1 | MSM-80649 | | O.K.I. |

While in the foregoing embodiments of the present invention have been set forth in considerable detail for the purposes of making a complete disclosure of the invention, it may be apparent to those of skill in the art that numerous changes may be made in such detail without departing from the spirit and principles of the invention.

What is claimed is:

1. In a pipette including a housing containing a pipette piston mounted in a cylinder for axial movement in one direction to compress a piston return spring and dispense fluid from an opening in the cylinder and axial return movement in response to the compressed return spring for drawing fluid into the pipette, the improvement comprising:

a dashpot in the housing for regulating the return movement of the piston, the dashpot comprising:

a closed chamber in the housing, a dashpot piston mounted for axial movement in the chamber, and a shaft coupled to the dashpot piston within and extending axially through the chamber for coupling at one end to the pipette piston and at an opposite end to a pipette actuator for imparting axial movement to the shaft.

2. The improvement of claim 1 further including means defining a fluid leakage path to an end of the chamber.

3. The improvement of claim 2 wherein the dashpot accommodates blow-out of residual fluid from the pipette and comprises:

a hollow within the dashpot piston, the shaft extending axially through the hollow, a spring retainer on the shaft within the hollow, a spring mounted for compression between the spring retainer and an end of the hollow nearest the cylinder to urge the retainer against an opposite end of the hollow, whereby the shaft is movable axially toward and relative to the opposite end of the hollow to move the pipette piston axially from a home position within the cylinder to blow any residual fluid from the cylinder.

4. The improvement of claim 2 wherein the leakage path defining means comprises, a port in the chamber adjacent an end nearest the cylinder for drawing air into the chamber in response to movement of the dashpot piston away from the cylinder.

5. The improvement of claim 4 further including a valve mounted in the chamber for opening in response to movement of the dashpot piston toward the cylinder to exit air from the chamber.

6. The improvement of claim 1 further including transducer means carried by the dashpot piston for signaling the position of the pipette within the cylinder.

7. The improvement of claim 6 wherein the transducer means comprises a variable capacitor including a movable plate carried by the dashpot piston and at least one stationary plate carried by the chamber.

* * * * *